(12) United States Patent
Beck et al.

(10) Patent No.: US 8,781,671 B2
(45) Date of Patent: Jul. 15, 2014

(54) ON-BOARD BRAKE SYSTEM DIAGNOSTIC AND REPORTING SYSTEM

(75) Inventors: Marshall G. Beck, Fineview, NY (US); Bryan M. McLaughlin, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 559 days.

(21) Appl. No.: 11/356,967

(22) Filed: Feb. 21, 2006

(65) Prior Publication Data
US 2006/0290199 A1    Dec. 28, 2006

Related U.S. Application Data

(60) Provisional application No. 60/688,722, filed on Jun. 9, 2005.

(51) Int. Cl.
*G06F 11/30* (2006.01)

(52) U.S. Cl.
USPC ......................... 701/29.1; 340/453

(58) Field of Classification Search
CPC ..... B60T 17/228; B60T 13/665; B60T 8/885; B60T 17/22; B60W 10/18; B60W 50/04; B60W 50/0205; B60W 10/20; B60L 3/12; B61L 15/0081
USPC .......... 303/22.2, 22.6, 7, 128; 701/19, 20, 99, 701/29.1, 31.4, 29.4, 32.4, 33.2, 33.4, 34.4; 340/453
See application file for complete search history.

(56) References Cited

U.S. PATENT DOCUMENTS

| | | | | |
|---|---|---|---|---|
| 2,993,199 | A | | 7/1961 | Brown et al. |
| 3,957,314 | A | * | 5/1976 | Falke ................................ 303/3 |
| 4,041,470 | A | * | 8/1977 | Slane et al. .................. 701/29.1 |
| 4,417,767 | A | * | 11/1983 | Billeter ......................... 303/22.2 |
| 4,487,060 | A | * | 12/1984 | Pomeroy ......................... 73/129 |
| 4,553,723 | A | * | 11/1985 | Nichols et al. ............. 246/167 R |
| 4,817,019 | A | * | 3/1989 | Morihara ....................... 702/188 |
| 4,859,000 | A | * | 8/1989 | Deno et al. ...................... 303/33 |
| 5,067,777 | A | * | 11/1991 | Schmitt ........................ 303/22.6 |
| 5,201,834 | A | * | 4/1993 | Grazioli et al. ............ 246/169 R |
| 5,267,473 | A | * | 12/1993 | Bezos et al. ..................... 73/129 |
| 5,290,095 | A | * | 3/1994 | Wood et al. ................... 303/133 |
| 5,390,988 | A | | 2/1995 | Shank |
| 5,394,137 | A | | 2/1995 | Orschek |
| 5,445,347 | A | * | 8/1995 | Ng ............................. 246/169 R |
| 5,451,099 | A | | 9/1995 | Hart et al. |
| 5,613,741 | A | * | 3/1997 | Shank ............................. 303/36 |
| RE35,590 | E | * | 8/1997 | Bezos et al. ................ 455/456.1 |
| 5,662,391 | A | * | 9/1997 | McKay ........................ 303/22.4 |
| 5,676,431 | A | | 10/1997 | McLaughlin et al. |
| 5,681,015 | A | * | 10/1997 | Kull .......................... 246/187 C |
| 5,738,311 | A | * | 4/1998 | Fernandez ..................... 246/168 |

(Continued)

*Primary Examiner* — Thomas Black
*Assistant Examiner* — Sze-Hon Kong
(74) *Attorney, Agent, or Firm* — Bond Schoeneck & King, PLLC

(57) ABSTRACT

A brake valve diagnostic and reporting system for a pneumatic only brake valve on a rail car which includes a brake pipe transducer for measuring brake pipe pressure; and a brake cylinder transducer for measuring brake cylinder pressure. A processor receives measurements from the transducers, compares the measurements against stored brake performance profiles, determines brake status from the comparison and prepares an event report for preselected brake statuses. A wireless transmitter connected to the processor transmits the report. An energy storage device powers the processor and transmitter.

11 Claims, 2 Drawing Sheets

(56) References Cited

U.S. PATENT DOCUMENTS

| | | | |
|---|---|---|---|
| 5,758,848 A * | 6/1998 | Beule | 246/182 B |
| 5,808,909 A * | 9/1998 | Rees | 702/114 |
| 5,813,635 A * | 9/1998 | Fernandez | 246/168 |
| 5,817,934 A * | 10/1998 | Skantar | 73/121 |
| 5,862,048 A | 1/1999 | Knight | |
| 5,869,765 A | 2/1999 | Scott et al. | |
| 5,892,437 A * | 4/1999 | Scheibe et al. | 340/467 |
| 5,924,774 A * | 7/1999 | Cook et al. | 303/3 |
| 6,094,977 A | 8/2000 | Vaughn | |
| 6,126,247 A * | 10/2000 | Paul et al. | 303/7 |
| 6,172,619 B1 * | 1/2001 | Lumbis et al. | 340/933 |
| 6,175,784 B1 | 1/2001 | Jicha et al. | |
| 6,189,980 B1 * | 2/2001 | Kull | 303/7 |
| 6,206,483 B1 * | 3/2001 | LaLone | 303/22.2 |
| 6,269,682 B1 | 8/2001 | Vaughn | |
| 6,302,495 B1 * | 10/2001 | Peltz | 303/16 |
| 6,322,025 B1 * | 11/2001 | Colbert et al. | 246/167 R |
| 6,400,281 B1 * | 6/2002 | Darby et al. | 340/933 |
| 6,435,623 B1 * | 8/2002 | Peltz | 303/15 |
| 6,457,782 B1 | 10/2002 | Truglio | |
| 6,626,034 B2 * | 9/2003 | Marra et al. | 73/121 |
| 6,648,424 B2 * | 11/2003 | Vaughn | 303/22.2 |
| 6,668,216 B2 * | 12/2003 | Mays | 701/19 |
| 6,736,071 B2 * | 5/2004 | Engle | 105/238.1 |
| 6,837,550 B2 * | 1/2005 | Dougherty et al. | 303/3 |
| 6,850,869 B2 * | 2/2005 | Pierro et al. | 702/184 |
| 6,867,708 B2 * | 3/2005 | Darby et al. | 340/933 |
| 6,891,468 B2 * | 5/2005 | Koenigsberg et al. | 340/453 |
| 6,991,301 B2 * | 1/2006 | Aurich et al. | 303/15 |
| 6,997,418 B1 * | 2/2006 | Sanzone | 246/167 R |
| 7,038,597 B2 * | 5/2006 | Smith | 340/933 |
| 7,040,150 B2 * | 5/2006 | Hawthorne et al. | 73/121 |
| 7,054,777 B2 * | 5/2006 | Crane et al. | 702/114 |
| 7,073,753 B2 * | 7/2006 | Root et al. | 246/72 |
| 7,144,090 B2 * | 12/2006 | Kull et al. | 303/118.1 |
| 7,178,881 B2 * | 2/2007 | Check et al. | 303/9.69 |
| 7,219,067 B1 * | 5/2007 | McMullen et al. | 705/4 |
| 7,373,224 B2 * | 5/2008 | Goetz et al. | 701/29 |
| 7,386,376 B2 * | 6/2008 | Basir et al. | 701/35 |
| 7,497,305 B2 * | 3/2009 | Miller et al. | 188/1.11 E |
| 7,627,546 B2 * | 12/2009 | Moser et al. | 1/1 |
| 7,664,459 B2 * | 2/2010 | Smith et al. | 455/7 |
| 7,769,509 B2 * | 8/2010 | Gaughan et al. | 701/29 |
| 2001/0015575 A1 | 8/2001 | Truglio et al. | |
| 2002/0019688 A1 * | 2/2002 | Mantini et al. | 701/29 |
| 2002/0027495 A1 * | 3/2002 | Darby et al. | 340/298 |
| 2002/0116992 A1 * | 8/2002 | Rickel | 73/146 |
| 2002/0153765 A1 * | 10/2002 | Levy et al. | 303/6.1 |
| 2002/0188593 A1 * | 12/2002 | Moser et al. | 707/1 |
| 2003/0222774 A1 * | 12/2003 | Koenigsberg et al. | 340/453 |
| 2004/0192348 A1 | 9/2004 | Gudmundsson et al. | |
| 2005/0171696 A1 * | 8/2005 | Naden et al. | 701/214 |
| 2005/0205719 A1 * | 9/2005 | Hendrickson et al. | 246/122 R |
| 2005/0283285 A1 * | 12/2005 | Ying | 701/29 |
| 2006/0047379 A1 * | 3/2006 | Schullian et al. | 701/19 |
| 2006/0181142 A1 * | 8/2006 | Hettinger | 303/22.7 |
| 2006/0195327 A1 * | 8/2006 | Kumar et al. | 705/1 |

* cited by examiner

ON-BOARD BRAKE SYSTEM DIAGNOSTIC AND REPORTING SYSTEM

CROSS-REFERENCE

This application claims the benefit of and incorporates herein by reference provisional application Ser. No. 60/688,722 filed Jun. 9, 2005.

BACKGROUND AND SUMMARY OF THE INVENTION

The present invention relates generally to railroad brake monitoring systems, and more specifically to a monitoring and diagnostic system for a pneumatic only brakes on a rail car.

Portable single car testers are known. These are used for cars that were not connected to a train. They put the brake valve and the brake system on the car through various tests by manipulating the valves and making various measurements at various points including the brake pipe pressure and brakes cylinder pressure. Typical examples are shown in U.S. Pat. Nos. 5,808,909, 6,094,977 and 6,269,682. An interface for connection to an electronically controlled pneumatic (ECP) brake system is described in the U.S. Pat. No. 5,808,909.

Electric pneumatic brake systems are either stand alone electronic valves which are connected by wire or radio to the locomotive and receives braking signals electrically to control the brakes by controlling the air to and from the brake cylinder. The ECP system may also include an overlay or a pilot adaptor wherein a standard pneumatic valve is manipulated by the solenoids to perform its normal function while the brake pipe is still charged. Typical adaptor systems are shown by U.S. Pat. Nos. 5,390,988 and 5,676,431

U.S. Pat. No. 2,993,199 is a train inspection apparatus which determines whether a light or a full brake has been applied or whether the brakes have been released. This is an electrical polling system for a wired train. U.S. Pat. No. 2,993,199 and U.S. Pat. No. 5,390,988 monitor the brake cylinder pressure which is reported to the head end for the locomotive engineer. U.S. Pat. No. 5,676,431 includes a transducer for brake pipe, brake cylinder, and auxiliary reservoir and uses information to initiate braking electric pneumatically as well as addressing stuck brakes.

U.S. Pat. No. 5,862,048 is a microprocessor electric-pneumatic locomotive brake control and train monitoring system. This is an electric pneumatic brake system on the car with sensors whose valves are transmitted back to the head end processor in the locomotive. The braking diagnostic functions include stuck brake identification, release while the train is in motion, collective gradual release of train brakes, out of tolerance brake cylinder pressures, accelerated direct release brakes, the source of emergencies, wheel off detection, wheel identification by number and location, status of every train vehicle, box detection, and sliding flat wheels. This information and sensors are part of the EPC brake control system.

U.S. Pat. No. 6,175,784 is a remotely operated rail car status monitor and control system. The hand brake status and release monitor determines and reports the status of the hand brake and an operator releases the hand brake. The monitor also includes a plurality of sensors which includes a slide wheel sensor and train handling sensor. The train handling sensor identifies impact. The car monitoring device responds to a wakeup signal from a hand held data terminal.

U.S. Pat. No. 6,837,550 is a brake system diagnostic using a hand-held radio device. The car brake system includes a radio based feed valve which includes a sensor to measure different pressures in the brake system. The hand-held device retrieves brake system data and information from the radio based feed valve and interprets the retrieved data and information. Maintenance is performed based on the interpretation of the data and information.

A brake system diagnostic and reporting system for a pneumatic only brake valve on a rail car according to the present disclosure includes a brake pipe transducer for measuring brake pipe pressure; and a brake cylinder transducer for measuring brake cylinder pressure. A processor receives measurements from the transducers, compares the measurements against stored brake performance profiles, determines brake status from the comparison and prepares an event report for preselected brake statuses. A wireless transmitter connected to the processor transmits the report. An energy storage device powers the processor and transmitter.

The system may include a geographic location system for determining the location of the rail car connected to the processor; and the processor provides time and location with the event report. The location system may be a global positioning system which provides location and speed and the processor provides speed with the event report. The system may include an accelerometer connected to the processor and the processor provides measurements from the accelerometer with the event report.

The processor may determine at least two of the following brake statuses: good; degradation requiring notice at maintenance; degradation requiring notice at destination; and failure. The processor may determine one or more of the following faults: brake valve failure; slow to apply; slow to release; and failure to release. The processor stores a moving window of measurements from the transducers and provides at least a portion of the window before the event with the event report.

The brake pipe transducer is connected to one of the following: the brake pipe and a brake pipe test port on the brake valve; and wherein the brake cylinder transducer is connected to one of the following: the brake cylinder, a brake cylinder output port of the brake valve, and a brake cylinder test port on the brake valve. If the car includes an empty/load device connecting the brake valve to the brake cylinder, the brake cylinder transducer may also be connected to a brake cylinder output port of the empty/load device.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
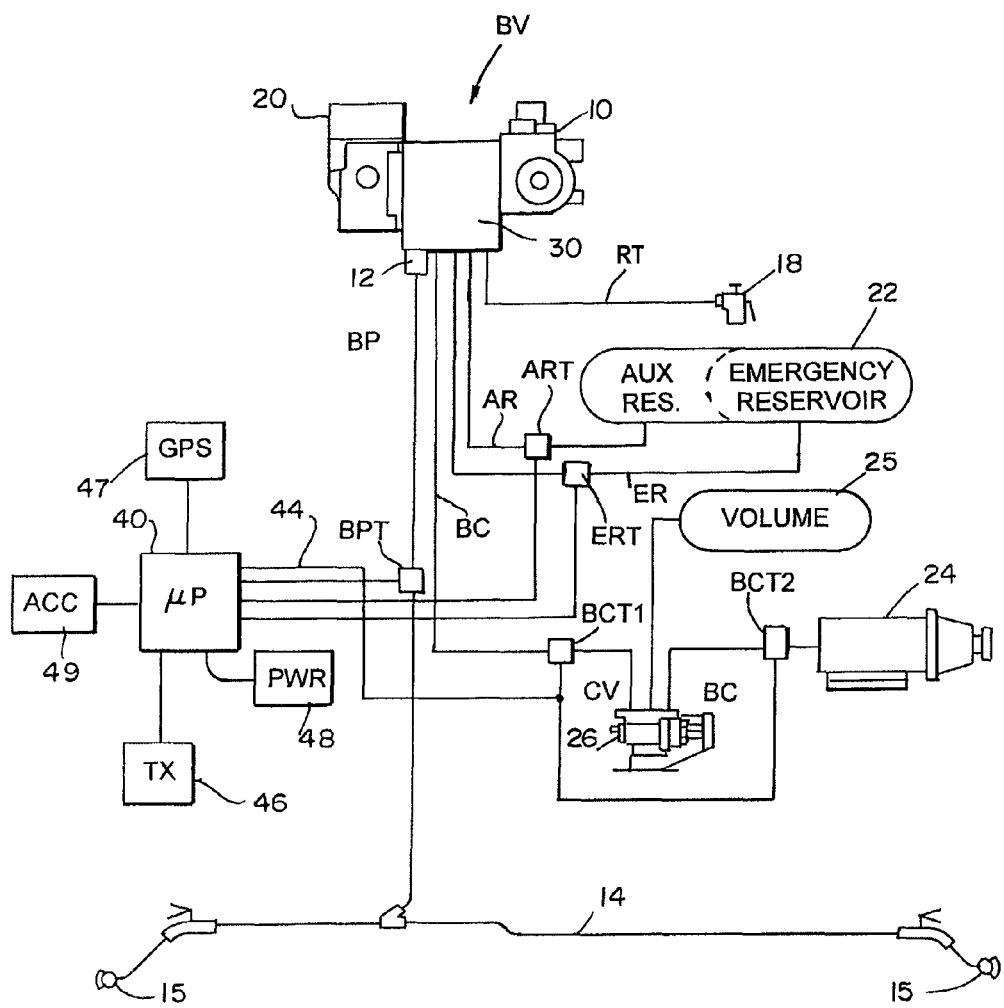
FIG. 1 is a block diagram of a pneumatic only brake system of a rail car with the brake valve diagnostic and reporting system according the present disclosure.

FIG. 1 shows a pneumatic only rail car. The car is part of a train which includes a brake pipe 14 extending through the train and coupled together by couplers or glad-hands 15. It also includes a standard pneumatic brake valve BV having a service portion 10 and an emergency portion 20 connected to a pipe bracket 30. The brake pipe 14 is connected through a cut-off cock 12 to port BP of the pipe bracket 30. A retainer port RT is connected to retainer valve 18. A reservoir 22 is shown as a combined reservoir having an emergency and an auxiliary section connected to ports ER and AR, respectively. Port BC of the pipe bracket 30 is connected to port CV of an empty/load device 26 having its own reservoir 25. The output signal BC of the empty/load device 26 is connected to the brake cylinders 24.

The brake valve and reporting diagnostics system includes a microprocessor 40 connected by wires 44 to a brake pipe transducer (BPT), a brake cylinder transducer (BCT), an auxiliary reservoir transducer (ART), and an emergency reservoir transducer (ERT). The system also includes a transmitter 46 and a power source 48.

The graphic representation shows the transducers being connected in the piping of the pneumatic brake system. The brake cylinder transducers BCT1 and BCT2 are connected on the input and output of the empty/load device 26. Either one or both of the transducers may be used. This also allows monitoring the operation of the empty load device 26. Either or both of the reservoir transducers ART and ERT may be used or deleted from the system. The reservoir transducers provide another variable in monitoring and diagnostics of the brake valve (BV).

If the brake cylinder 24 includes test ports as described in U.S. Pat. No. 5,869,765 the brake cylinder transducer BCT may be connected to that port and not through the piping leading into the brake cylinder 24. Similarly if the empty/load device has a brake cylinder test port as described in U.S. Pat. No. 6,206,483 the transducer may be provided at that test port instead of in the pipe.

A geographic location system, for example GPS, 47 connected to the microprocessor 40 which determines location of the rail car and provides time and location information or time stamp. This may also include the speed information. The microprocessor 40 correlates this information with the data collected from the pressure transducers. The system may also include an accelerometer 49 connected to the microprocessor 40 to determine ride quality.

Figure 2:
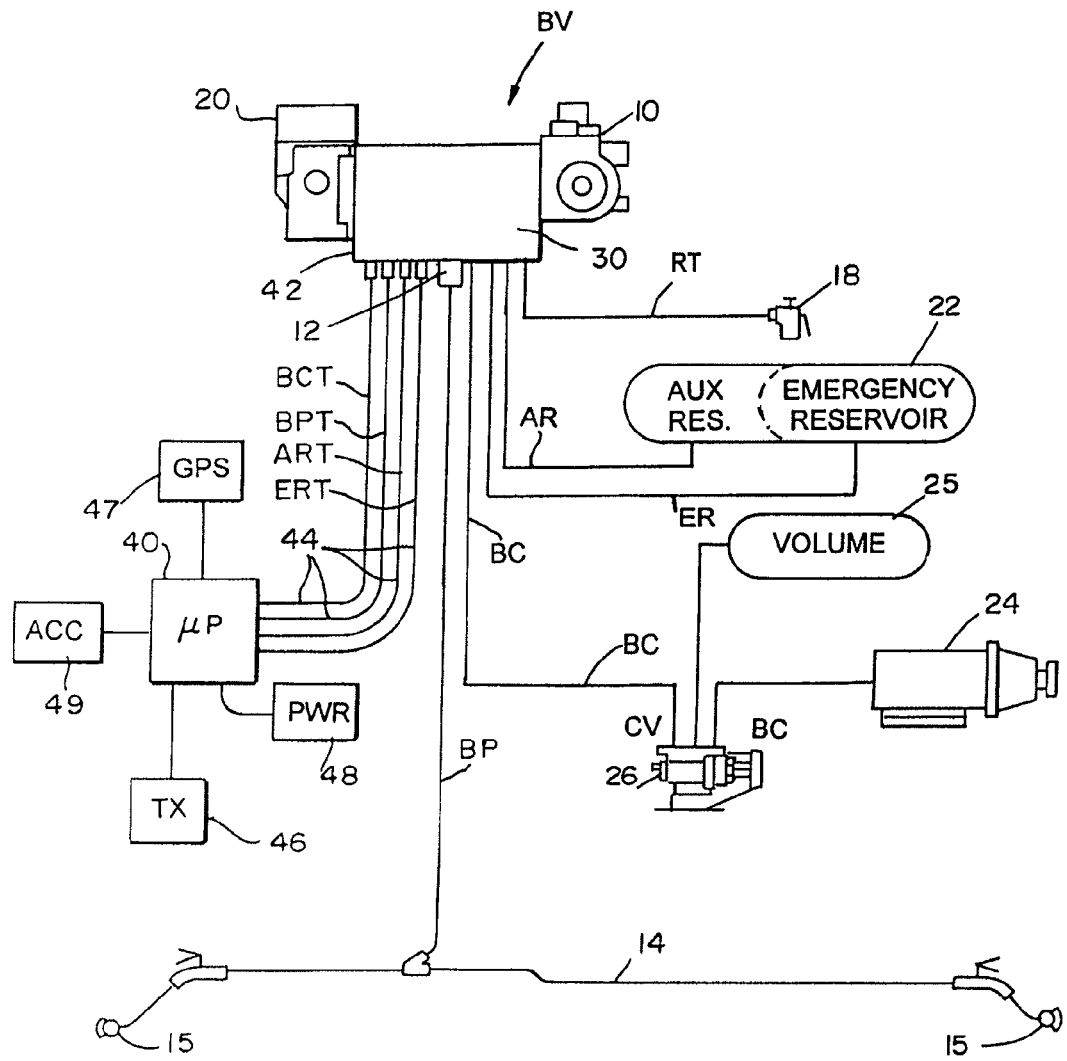
FIG. 2 is a block diagram of a pneumatic only brake system of a rail car having test ports with the brake valve diagnostic and reporting system according the present disclosure.

FIG. 2 is similar to FIG. 1 except that it shows the brake valve (BV) including an access plate 42, providing access or test ports to the brake cylinder (BC), the brake pipe (BP), the auxiliary reservoir (AR), and the emergency reservoir (ER). Appropriate transducers BCT, BPT, ART, and ERT may be connected to these test ports. Example of such access plate is shown in U.S. Pat. No. 5,451,099. Similarly, plate 42 may be the adaptor plate used in an electro-pneumatic brake control valve illustrated in U.S. Pat. No. 6,457,782. Each of the patents discussed above are incorporated herein by reference to the extent required for further explanation of the details. As a further alternative the plate 42 may have the transducers therein or thereon and provided as a single unit. Wires 44 connect the transducers to the microprocessor 40.

It should be noted where the railcar brake system does not include an empty load valve 26, the output BC of the pipe bracket 30 is connected directly to the brake cylinder 24 in that case only a single brake cylinder transducer BCT would be required.

The processor 40 receives transducer signals on lines 44 from the transducers and compares the inputs against an established performance profile or formula. The processor is capable of determining both acceptable and out of tolerance brake valve responses to a range of brake pipe inputs which is defined as a "fault" such as:

brake valve failure
    Stuck or dragging brake
    Slow to apply brake
    Slow to release brake
    Slow reservoir charge
    Empty/Load valve failure The following are examples of how the faults are determined, although other methods may be used. In a pneumatic brake system, brake valve (BV) responds to the raising and lowering of brake pipe pressure to release or apply the brake. The amount of brake application is proportional to the dropping pressure of the brake pipe. A rise in the brake pipe pressure causes the brake valve (BV) to release the pressure in the brake cylinder 24. This is produced by a relay valve which supplies pressure from the reservoirs 22 to the brake cylinder proportional to the brake pipe pressure. Thus knowing the desired value for brake cylinder pressure corresponding to a given brake pipe pressures, the software in the microprocessor 40 can determine whether the appropriate response has been produced. This can be determined by measuring the brake pipe pressure and the brake cylinder pressure over time. Also the value of the reservoir 22 may be measured and used an addition in direction of the brake valve BV's response.

Not only can there be made a determination of whether the brake cylinders has the appropriate end value, but there can also be a measure of how long it took the brake cylinder pressure to be reached after the brake pipe pressure has stabilized. The algorithms profile will also determine if for a sufficient increase of the break pipe pressure that the brake cylinder should be released. If after a brake pipe release pressure is produced the brake cylinder still has a pneumatic pressure, this would indicate a stuck brake. Providing the two brake cylinder transducers BCT1 and BCT2, the operability of the empty load device 26 may also be monitored.

The transducer input data is compiled and compared to the baseline performance characteristics to determine the status or state of the brake system and determine what diagnostic message is appropriate. These states may include 1) good, 2) performance degradation noted, advise at next scheduled or unscheduled maintenance, 3) performance degradation noted, advise at destination, or 4) failure noted, proceed to next available repair point, or stop train immediately. The information is then coupled with the GPS time, speed and location stamp. Once an event occurs, the onboard processor 40 will retain data from the pressure transducers, accelerometer and GPS inputs for some determined time period at least prior to the event. A moving window of data is stored in the processor 40 and allows preparing a report with data prior to and after an event. At this time, an exception message and/or data related to the out-of-norm event can be automatically sent as a report via wireless communication 46 (for example a cell phone) to various pre-determined addresses. Information can be entered into work order system and/or closed looped back to the locomotive. The information from the accelerometer 49 is indicia of ride quality at time of failure.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A rail car having a pneumatic brake system, the brake system comprising:
    a brake having a brake cylinder on the rail car;
    a brake pipe which extends through a train including the rail car, the brake pipe being the air pipe of the train's pneumatic braking system;
    a pneumatic only brake valve connected to and responsive to pressure in the brake pipe to apply and release the brake;

an empty load device connecting the brake valve to the brake cylinder;

a brake system diagnostic and reporting system, which is both rail car-specific and a separate unit from the pneumatic only brake valve included on the rail car, wherein the rail car-specific brake system diagnostic and reporting system comprises:

a brake pipe transducer configured to measure pressure of the brake pipe;

a plurality of brake cylinder transducers configured to measure pressure of the brake cylinder, a first one of the brake cylinder transducers being connected to an input of the empty load device and a second one of the brake cylinder transducers being connected to an output of the empty load device, wherein either or both of the brake cylinder transducers operates to provide pressure measurements;

a processor receives measurements from both the brake pipe transducer and the plurality of brake cylinder transducers, compares the measurements over a period of time against stored brake performance profiles, determines status of the brake from the comparison and prepare a rail car-specific event report in response to a determination of preselected brake statuses that indicate an out-of-norm event;

a wireless transmitter connected to the processor and configured to automatically transmit the rail car-specific event report to at least one address;

an energy storage device configured to power the processor and transmitter; and an accelerometer connected to the processor, wherein, once the out-of-norm event occurs, the processor retains data from the brake pipe transducer and plurality of brake cylinder transducers and the accelerometer for a predetermined time period at least prior to the out-of-norm event, and wherein the processor is further configured to provide measurements from the accelerometer with the rail car-specific event report, wherein the accelerometer measurements are indicative of ride quality at time of the out-of-norm event, wherein operation of the plurality of brake cylinder transducers produces measurement data analyzed by the processor to determine the operability of the empty load device and to determine status of the brake by determination of whether the brake cylinders have an appropriate end value and determination of a time period for the brake cylinder pressure to be reached after the brake pipe pressure stabilized, wherein the processor determines if, for a sufficient increase of the brake pipe pressure measured by the brake pipe transducer, that the brake cylinder should be released and, whether a stuck brake is present based on the brake cylinder pressure measured by the plurality of brake cylinder transducers indicating that the brake cylinder still has pneumatic pressure after a brake pipe release pressure has been produced, and wherein the processor determines, based on comparison of the measurement data to baseline performance characteristics, the status or state of the brake system and determines what diagnostic message to include with the rail car-specific report, and the rail car-specific event report includes a maintenance diagnostic message coupled with a GPS time, speed and location stamp.

2. The brake system of claim 1, further comprising a geographic location system configured to determine a location of the rail car connected to the processor, wherein the processor is configured to provide the GPS time and location for the rail car-specific event report.

3. The system of claim 2, wherein the geographic location system is a global positioning system which is configured to provide the location and speed data for the rail car-specific event report.

4. The system of claim 1, wherein:

the processor is configured to determine at least two of the following brake statuses: good; degradation requiring notice at maintenance; degradation requiring notice at destination; and failure; and the processor is further configured to determine one or more of the following faults: brake valve failure; slow to apply; slow to release; and failure to release.

5. A rail car-specific system having a pneumatic only brake valve connected to and responsive to pressure in a brake pipe which extends through a train including the rail car, the brake pipe being the air pipe of the train's pneumatic braking system, the pneumatic only brake valve responding to the pressure in the brake pipe to apply and release a brake having a brake cylinder on the rail car, an empty load device connecting the brake valve to the brake cylinder, the pneumatic only brake valve having a brake system diagnostic and reporting system, the rail car-specific system comprising:

a brake pipe transducer configured to measure pressure of the brake pipe;

a plurality of brake cylinder transducers configured to measure pressure of the brake cylinder, a first one of the brake cylinder transducers being connected to an input of the empty load device and a second one of the brake cylinder transducers being connected to an output of the empty load device, wherein either or both of the brake cylinder transducers operates to provide pressure measurements;

a processor configured to automatically receive measurements from the brake pipe transducer and the brake cylinder transducers, to compare the measurements over a period of time, compare the measurements against stored brake performance profiles, determine brake status from the comparison and prepare a rail car-specific event report for preselected brake statuses that indicate an out-of-norm event;

a wireless transmitter connected to the processor and configured to automatically transmit the rail car-specific report to at least one address;

an accelerometer connected to the processor, and an energy storage device configured to power the processor and transmitter, wherein the processor is configured to store a moving window of the measurements from the transducers and provide at least a portion of the window before an event with the car-specific event report, and wherein, once the out-of-norm event occurs, the processor retains data from the brake pipe transducer and plurality of brake cylinder transducers and accelerometer for a predetermined time period at least prior to the out-of-norm event, and wherein the processor is further configured to provide measurements from the accelerometer with the rail car-specific event report, wherein the accelerometer measurements are indicative of ride quality at time of the out-of-norm event, wherein operation of the plurality of brake cylinder transducers produces measurement data analyzed by the processor to determine the operability of the empty load device and to determine status of the brake by determination of whether the brake cylinders have an appropriate end value and determination of a time period for the brake cylinder pressure to be reached after the brake pipe pressure stabilized, wherein the processor determines if, for a sufficient increase of the brake pipe pressure measured by the brake pipe transducer, that the brake cylinder should be released and, whether a stuck brake is present based on the brake cylinder pressure measured by the plurality of brake cylinder transducers indicating that the brake cylinder still has pneumatic pressure after a brake pipe release pressure has been produced, and wherein the processor determines, based on comparison of the measurement data to baseline performance characteristics, the status or state of the brake system and determines what diagnostic message to include with the rail car-specific report, and the rail car-specific event report includes a maintenance diagnostic message coupled with a GPS time, speed and location stamp.

6. The system of claim 5, wherein the processor is configured to store a moving window of measurements from the transducers and provides a portion of the window before and after the event with the rail car-specific event report.

7. The system of claim 5, wherein the processor is configured to determine one or more of the following faults: brake valve failure; slow to apply; slow to release; and failure to release.

8. The system of claim 5, wherein the brake pipe transducer is connected to one of the following: the brake pipe and a brake pipe test port on the brake valve, and wherein the brake cylinder transducer is connected to one of the following: the brake cylinder, a brake cylinder output port of the brake valve, and a brake cylinder test port on the brake valve.

9. The system of claim 5, wherein the brake cylinder transducer is connected to one of the following: the brake cylinder, a brake cylinder output port of the brake valve, a brake cylinder output port of the empty load device and a brake cylinder test port on the brake valve.

10. The system of claim 5, wherein the processor is configured to cause an event report to be transmitted automatically via the wireless transmitter to a unit remote from the rail car but specific to the train.

11. A method of diagnostic and reporting of brake system on a rail car which has a pneumatic only brake valve connected to and configured to be responsive to pressure in a brake pipe that extends through a train including the rail car, the brake pipe being the air pipe of the train's pneumatic braking system, the brake valve responding to the pressure in the brake pipe to apply and release a brake and having a brake cylinder on the car, an empty load device connecting the brake valve to the brake cylinder, the method comprising:

connecting a brake pipe transducer and a plurality of brake cylinder transducers of the brake system diagnostic and reporting system to the brake system of the rail car and automatically performing the following actions on board the rail car by the brake system diagnostic and reporting system, a first one of the brake cylinder transducers being connected to an input of the empty load device and a second one of the brake cylinder transducers being connected to an output of the empty load device, wherein either or both of the brake cylinder transducers operates to provide pressure measurements;

measuring brake pipe pressure using the brake pipe transducer and measuring the brake cylinder pressure using the plurality of brake cylinder transducers;

comparing the brake pipe pressure and brake cylinder pressure measurements against stored brake performance profiles, determining brake status from the comparison and preparing a rail car-specific event report for preselected brake statuses indicative of an out-of-norm event; and wirelessly transmitting the rail car-specific event report to at least one address, wherein, once the out-of-norm event occurs, the processor retains data from the brake pipe transducer and plurality of brake cylinder transducers and accelerometer for a predetermined time period at least prior to the out-of-norm event, and wherein the processor is further configured to provide measurements from the accelerometer with the rail car-specific event report, wherein the accelerometer measurements are indicative of ride quality at time of the out-of-norm event, and wherein operation of the plurality of brake cylinder transducers produces measurement data analyzed by the processor to determine the operability of the empty load device and to determine status of the brake by determination of whether the brake cylinders have an appropriate end value and determination of a time period for the brake cylinder pressure to be reached after the brake pipe pressure stabilized, wherein the processor determines if, for a sufficient increase of the brake pipe pressure measured by the brake pipe transducer, that the brake cylinder should be released and, whether a stuck brake is present based on the brake cylinder pressure measured by the plurality of brake cylinder transducers indicating that the brake cylinder still has pneumatic pressure after a brake pipe release pressure has been produced and wherein the processor determines, based on comparison of the measurement data to baseline performance characteristics, the status or state of the brake system and determines what diagnostic message to include with the rail car-specific report, and the rail car-specific event report includes a maintenance diagnostic message coupled with a GPS time, speed and location stamp.

* * * * *